US012715056B2

(12) United States Patent
Schaefer et al.

(10) Patent No.: US 12,715,056 B2
(45) Date of Patent: Aug. 25, 2026

(54) DENTAL TOOL HAVING A MINIATURIZED RFID TAG AND DENTAL CNC MILLING / GRINDING MACHINE USING THE SAME

(71) Applicants: DENTSPLY SIRONA Inc., York, PA (US); SIRONA DENTAL SYSTEMS GMBH, Bensheim (DE)

(72) Inventors: Andreas Schaefer, Rimbach (DE); Oliver Nowarra, Leimen (DE); Michael Turzer, Kolmbach (DE); Peter Fornoff, Oberkainsbach (DE)

(73) Assignee: Dentsply Sirona Inc., York, PA (US)

(*) Notice: Subject to any disclaimer, the term of this patent is extended or adjusted under 35 U.S.C. 154(b) by 852 days.

(21) Appl. No.: 17/641,218

(22) PCT Filed: Sep. 24, 2020

(86) PCT No.: PCT/EP2020/076660
§ 371 (c)(1),
(2) Date: Mar. 8, 2022

(87) PCT Pub. No.: WO2021/058622
PCT Pub. Date: Apr. 1, 2021

(65) Prior Publication Data

US 2024/0051041 A1 Feb. 15, 2024

(30) Foreign Application Priority Data

Sep. 24, 2019 (EP) .................................... 19199321

(51) Int. Cl.

| | |
|---|---|
| ***B23C 5/00*** | (2006.01) |
| ***A61C 13/00*** | (2006.01) |
| ***G06K 19/07*** | (2006.01) |

(52) U.S. Cl.
CPC .......... *B23C 5/006* (2013.01); *A61C 13/0004* (2013.01); *G06K 19/0723* (2013.01); *A61C 2204/005* (2013.01); *Y10T 409/30084* (2015.01)

(58) Field of Classification Search
CPC ........... Y10T 409/30; Y10T 409/30084; Y10T 483/132; Y10T 483/134; A61C 16/0004;
(Continued)

(56) References Cited

U.S. PATENT DOCUMENTS 4,497,029 A * 1/1985 Kiyokawa ............ G05B 19/404
318/632
4,890,306 A * 12/1989 Noda ................ B23Q 17/0995
377/16

(Continued)

FOREIGN PATENT DOCUMENTS

| | | |
|---|---|---|
| AU | 2003220575 | 10/2003 |
| BR | PI0819394 | 4/2015 |

(Continued)

OTHER PUBLICATIONS

International Search Report; PCT/EP2020/076660; Oct. 22, 2020 (completed); Nov. 2, 2020 (mailed).

(Continued)

*Primary Examiner* — Sunil K Singh
*Assistant Examiner* — Michael Vitale
(74) *Attorney, Agent, or Firm* — SCHWEGMAN LUNDBERG & WOESSNER, P.A.

(57) ABSTRACT

A dental tool (1) for use in a dental CNC milling/grinding machine for machining a dental restoration from a workpiece (6), the dental tool (1) has a shaft (2). The dental tool includes a miniaturized RFID tag (3) which is arranged in front of the back end (**2*a*) of the shaft (2). A dental CNC milling/grinding machine (5**) is also disclosed and has a
(Continued)

machine compartment (5*a*) including one or more carriage units (5*b*) each adapted to exchangeably receive and drive one or more dental tools (1) for machining a dental restoration from a workpiece (6); one or more transceiver units (5*c*) each adapted to read and/or write the miniaturized RFID tag (3) of a dental tool (1); and a control unit adapted to control the transceiver units (5*c*), and the carriage units (5*b*) based on the information read from the miniaturized RFID tags (3).

22 Claims, 5 Drawing Sheets

(58) Field of Classification Search
CPC .......... A61C 13/0004; A61C 2204/005; G06K 19/0723; B23C 5/006
USPC ...................................... 483/8, 9; 409/64, 79
See application file for complete search history.

(56) References Cited

U.S. PATENT DOCUMENTS

| | | | | |
|---|---|---|---|---|
| 5,337,063 | A * | 8/1994 | Takahira | H01Q 1/2225 343/741 |
| 6,045,652 | A * | 4/2000 | Tuttle | H01Q 1/44 156/278 |
| 2002/0154029 | A1 | 10/2002 | Watters et al. | |
| 2005/0007296 | A1 * | 1/2005 | Endo | G06K 19/07779 343/895 |
| 2006/0214791 | A1 * | 9/2006 | Tethrake | A61B 90/98 340/572.1 |
| 2009/0175694 | A1 | 7/2009 | Craig et al. | |
| 2009/0234490 | A1 * | 9/2009 | Suprock | B23B 31/02 408/116 |
| 2009/0283595 | A1 * | 11/2009 | White | A61B 90/98 606/1 |
| 2011/0208170 | A1 | 8/2011 | Hafner et al. | |
| 2013/0200159 | A1 | 8/2013 | Webb et al. | |
| 2013/0244846 | A1 * | 9/2013 | Koch | A61C 13/0003 269/16 |
| 2019/0332085 | A1 * | 10/2019 | Huber | B23Q 17/2457 |

FOREIGN PATENT DOCUMENTS

| | | | | |
|---|---|---|---|---|
| CA | 2362635 | | 8/2000 | |
| CA | 2705469 | | 6/2009 | |
| CN | 101896313 | | 11/2010 | |
| DE | 102008024438 | | 11/2009 | |
| DE | 202018102658 | U1 * | 7/2018 | A61C 13/0022 |
| EP | 1155288 | | 11/2001 | |
| EP | 1746530 | A1 | 1/2007 | |
| EP | 2222436 | | 9/2010 | |
| EP | 2233103 | A2 | 9/2010 | |
| EP | 2320804 | | 5/2011 | |
| EP | 2587414 | A1 | 5/2013 | |
| EP | 3797731 | A1 | 3/2021 | |
| EP | 4041117 | | 3/2024 | |
| EP | 4338700 | | 3/2024 | |
| ES | 2317111 | T3 * | 4/2009 | B23B 31/02 |
| ES | 2572894 | | 6/2016 | |
| JP | 04122536 | A * | 4/1992 | |
| JP | 2002538519 | | 11/2002 | |
| JP | 2005066746 | A | 3/2005 | |
| JP | 2005508697 | A | 4/2005 | |
| JP | 2006157905 | A | 6/2006 | |
| JP | 2007083320 | A * | 4/2007 | |
| JP | 2008524003 | A | 7/2008 | |
| JP | 2011518045 | A | 6/2011 | |
| JP | 2011182849 | | 9/2011 | |
| JP | 2011524186 | A | 9/2011 | |
| JP | 2017006728 | A | 1/2017 | |
| JP | 2017064190 | A | 4/2017 | |
| JP | 2018060260 | A | 4/2018 | |
| JP | 7100753 | | 7/2022 | |
| JP | 2022550728 | | 12/2022 | |
| KR | 20100100955 | | 9/2010 | |
| KR | 101931776 | B1 | 12/2018 | |
| MX | 2010006337 | | 8/2010 | |
| RU | 2010128616 | | 1/2012 | |
| WO | 0050849 | A1 | 8/2000 | |
| WO | 2009076496 | | 6/2009 | |
| WO | 2009138324 | | 11/2009 | |
| WO | WO-2021058622 | A1 | 4/2021 | |

OTHER PUBLICATIONS

International Preliminary Report on Patentability; PCT/EP2020/076660; Oct. 22, 2020 (completed); Nov. 2, 2020 (mailed).

Written Opinion of the International Searching Authority; PCT/EP2020/076660; Oct. 22, 2020 (completed); Nov. 2, 2020 (mailed).

Japanese Office Action dated Jul. 16, 2024.

"European Application Serial No. 19199321.1, Extended European Search Report mailed Mar. 17, 2020", 8 pgs.

"European Application Serial No. 19199321.1, Noting of loss of rights pursuant to Rule 112(1) EPC mailed Oct. 21, 2021", 2 pgs.

"Korean Application Serial No. 10-2022-7011560, Notice of Preliminary Rejection mailed Feb. 27, 2025", W/English Translation, 17 pgs.

"Japanese Application Serial No. 2022-518997, Notification of Reasons for Refusal mailed Jan. 7, 2025", w English Translation, 16 pgs.

"European Application Serial No. 20775005.0, Response filed Jan. 28, 2023 to Communication pursuant to Rules 161(1) and 162 EPC mailed Jul. 22, 2022", 36 pgs.

"European Application Serial No. 24155210.8, Extended European Search Report mailed Apr. 24, 2024", 8 pgs.

"European Application Serial No. 24155210.8, Response filed Oct. 16, 2024 to Extended European Search Report mailed Apr. 24, 2024", 35 pgs.

"Japanese Application Serial No. 2022-518997, Examiners Decision of Final Refusal mailed Aug. 5, 2025", W Machine English Translation, 10 pgs.

"Japanese Application Serial No. 2022-518997, Appeal of an Adverse Decision filed Dec. 5, 2025", W/English Claims, 13 pgs.

* cited by examiner

DENTAL TOOL HAVING A MINIATURIZED RFID TAG AND DENTAL CNC MILLING / GRINDING MACHINE USING THE SAME

CROSS-REFERENCE TO RELATED APPLICATIONS

This is a National Phase application of International Application No. PCT/EP2020/076660, filed Sep. 24, 2020, which claims the benefit of and priority to European Application Ser. No. 19199321.1, filed on Sep. 24, 2019, which are herein incorporated by reference for all purposes.

TECHNICAL FIELD OF THE INVENTION

The present invention relates to a dental tool for use in a dental CNC milling/grinding machine for machining a dental restoration from a workpiece. The present invention also relates to a dental CNC milling/grinding machine for machining a dental restoration from a workpiece using one or more dental tools.

BACKGROUND OF THE INVENTION

In general, a dental CNC milling/grinding machine has a mounting unit for mounting at least one workpiece; and one or more carriage units each for driving at least one dental tool for machining a dental restoration from the workpiece. The shaft of the dental tool is mountable to a dental tool motor in the carriage unit. Usually a CAD/CAM software is used to construct the dental restoration and to provide the corresponding machining data to the dental CNC milling/grinding machine. The workpieces as well as the dental tools are consumables. The workpieces and the dental tools available on the market vary in size, shape, and material. Prior to the machining, the dental CNC milling/grinding machine must be equipped by a user with the desired workpiece and at least one adequate dental tool. If the dental tool does not specifically match the machining process, there is a risk that the dental restoration cannot be machined with the desired quality. In the worst case, the dental tool may be overrun its total service life or remaining service life if it has been used before in a preceding machining process. In such an event, the dental tool will break, and the dental restoration will receive damages. In less severe cases, the machining of the dental restoration is completed with an unacceptable low quality due to the use of the inadequate dental tool. In all these cases, the user satisfaction may decrease, and the users may complain about the quality.

SUMMARY

An objective of the present invention is to overcome the above-mentioned problems of the prior art and to provide a dental tool for use with a dental CNC milling/grinding machine which can prevent or reduce the risk that the dental restorations produced are unusable or have an unacceptable, low quality.

This objective is achieved through the dental tool as defined in claim 1, and the dental CNC milling/grinding machine as defined in claim 13. The other claims relate to further developments.

The present invention provides a dental tool for use in a dental CNC milling/grinding machine for machining a dental restoration from a workpiece. The dental tool has a shaft, and a miniaturized RFID tag which is arranged in front of the back end of the shaft.

The present invention also provides a dental CNC milling/grinding machine. The dental CNC milling/grinding machine comprises: at least one carriage unit adapted to exchangeably receive and drive one or more dental tools of the present invention; at least one transceiver unit adapted to read and/or write the miniaturized RFID tag of the dental tool; and a control unit adapted to control the transceiver units, and the carriage units based on the information read from the one or more miniaturized RFID tags.

A major advantageous effect of the present invention is that the miniaturized RFID tag can be used to store dental tool specific information which relates to the dental tool. Thereby, the dental tool specific information can be quickly and unambiguously acquired by means of the transceiver unit of the dental CNC milling/grinding machine. Accordingly, the dental CNC milling/grinding machine can be operated based on the dental tool specific information. Thereby, the risk of machining the dental restoration from the workpiece with an unacceptable, low quality can be prevented or reduced as much as possible. Thereby, also the risk of breakage of the dental tool and the resulting damages to dental restoration can be avoided or reduced as much as possible. Another major advantageous effect of the present invention is that the need that the user remembers or keeps a log of the dental tool specific information can be obviated, and the dental CNC milling/grinding machine can be operated safely and user-friendly. For instance, the user may safely re-use a dental tool when the dental CNC milling/grinding machine has determined that the dental tool has enough remaining service life for the machining process. For instance, the user can be prevented from using a dental tool in an undesignated dental tool motor on the carriage unit. Another major advantageous effect of the present invention is that the miniaturized RFID tag can be effectively read out by simple handling, namely by approaching the back end of the dental tool to the transceiver unit so that safe reading and/or writing can always take place in the range from direct contact up to a distance of a few millimeters. As the miniaturized RFID tag is arranged in the front of the back end of the shaft, a rotation-independent angular range with at least a hemispherical solid angle for communicating with the miniaturized RFID tag is guaranteed.

According to an embodiment of the present invention, the dental tool preferably has a robust protective housing that accommodates and seals the miniaturized RFID tag. The protective housing is preferably made from plastic material that encapsulates the miniaturized RFID tag. The front section of the protective housing is preferably mechanically connected to the back end of the shaft. Alternatively, an adhesive can be used for the connection. The miniaturized RFID tag is preferably embedded into the rear section of the protective housing, outside the shaft, for facilitating the RF communication with the transceiver unit of the dental CNC milling/grinding machine. The space between the miniaturized RFID tag and the protective housing is preferably filled with a sealing material. The protective housing and the miniaturized RFID tag preferably have a concentric, rotationally symmetric and balanced arrangement on the shaft of the dental tool. Thereby, the dental tool can be used in the dental tool motor of the carriage unit at relatively high rotational speeds, for instance, up to 60,000 revolutions per minute without any problems. The protective housing is optional. Thus, the miniaturized RFID tag can be directly arranged in front of the back end of the shaft and fixed in place through an adhesive seal or the like.

According to an embodiment of the present invention, the front section of the protective housing is preferably fitted into a bore that has been formed into the back end of the shaft of the dental tool. Thereby, the connection and the sealing can be further improved. In this embodiment, the rear section of the housing that accommodates the miniaturized RFID tag is arranged in front of the back end of the shaft, specifically outside the bore. Thereby, the transceiver unit can unimpededly communicate with the miniaturized RFID tag through the entire rearward direction and the entire radial direction.

According to an alternative embodiment of the present invention, the front section of the housing is preferably fitted onto a reduced diameter section that has been formed into the back end of the shaft of the dental tool. Thereby, the connection and the sealing can also be further improved. In this embodiment, the rear section of the housing that accommodates the miniaturized RFID tag is arranged in front of the reduced diameter section, specifically outside the shaft. Also, in this alternative embodiment, the transceiver unit can unimpededly communicate with the miniaturized RFID tag through the entire rearward direction and the entire radial direction. In addition, the reduced diameter section preferably has one or more circumferentially extending protrusions. And the front section of the housing is fitted onto the protrusions. Thereby, the connection and the sealing can be further improved. Alternatively, the reduced diameter section has one or more circumferentially extending grooves that respectively engage with matching claws formed on the front section of the housing. Thereby, the connection and the sealing can also be further improved.

According to an embodiment of the present invention, the miniaturized RFID tag is preferably a read-only type. The miniaturized RFID tag stores dental tool specific information which specifically relates to the dental tool. The dental tool specific information includes at least a unique ID, e.g., a universal unique identifier (UUID) for unambiguously identifying the dental tool. The dental tool specific information preferably further includes information on at least one of the type, the manufacturer, the lot number, the length, and the concentricity of the dental tool. According to an alternative embodiment, the miniaturized RFID tag is preferably a read & write type. In this alternative embodiment, the dental tool specific information preferably further includes the remaining service life of the dental tool or alternatively the usage time of the dental tool which can be both determined through the dental CNC milling/grinding machine and written through the transceiver unit into the miniaturized RFID tag. The miniaturized RFID tag preferably has a miniaturized air core coil.

According to an embodiment of the present invention, the dental CNC milling/grinding machine is preferably provided with a communication unit for transmitting information to and/or receiving information from a data storage unit for at least storing the above-described dental tool specific information of one or more different dental tools. The data storage unit may be accessed for reading, writing, overwriting, updating the dental tool specific information via the unique ID. The data storage unit may be internal or external to the dental CNC milling/grinding machine. The data storage unit may be accessible via a network, internet or the like. The data storage unit stores at least a unique ID for identifying the dental tool, and dental tool specific information on at least one of the type, the manufacturer, the lot number, the length, and the concentricity, and the remaining service life of the dental tool.

According to an embodiment of the present invention, the dental CNC milling/grinding machine preferably has a display for displaying information based on the dental tool specific information relating to the dental tool uniquely identified through the transceiver unit. The miniaturized RFID tag of the dental tool is read out by means of the transceiver unit. Thereafter, the dental tool specific information read from the miniaturized RFID tag and/or received from the data storage unit is displayed on the display. Thereby the user can gain detailed information on the identified dental tool and determine whether this dental tool is adequate for the forthcoming machining process. The display also preferably shows dental tool specific information about the dental tool or the dental tools that are needed for the forthcoming machining process and the associated positions on the carriage unit where the dental tools should be mounted by the user. Thus, the display serves for informing and also guiding the user for the forthcoming machining process in terms of the dental tools, the workpieces etc.

According to an embodiment of the present invention, the control unit inhibits drive of a carriage unit if it determines that the dental tool is worn or has an insufficient remaining service life based on the dental tool specific information or is mounted to an undesignated i.e., wrong, position in the carriage unit.

According to an embodiment of the present invention, the dental CNC milling/grinding machine has a panel that covers the transceiver unit. The panel is sufficiently thin and close to the transceiver unit so as to allow RF communication between a miniaturized RFID tag and the transceiver unit. The location of the transceiver unit is marked or easily recognizable on the panel such that the user can easily locate the dental tool near the transceiver unit. Thereby, the dental tool can be identified before mounting into any position on the carriage unit. Thereby the user can be guided, for instance, through the display before mounting the dental tool to the carriage unit. For instance, the user may be informed whether the dental tool is adequate for the forthcoming machining process and at which position it must be mounted on the carriage unit. Acoustic guiding may be alternatively used.

According to an alternative embodiment, one or more transceiver units are arranged close to the mounting positions of the dental tools in one or more carriage units. Thereby, a dental tool can be identified also after it has been mounted into a carriage unit. Thereby, the user can be informed whether an adequate dental tool has been mounted into the designated, correct position on the carriage unit. Similarly, the user can also be further guided through the display. The antenna of each transceiver unit is preferably configured by the associated stator of the dental tool motor in the carriage unit. Alternatively, one or more separate antennas may be arranged for each transceiver unit into the carriage units.

BRIEF DESCRIPTION OF THE DRAWINGS

In the subsequent description, further aspects and advantageous effects of the present invention will be described in more detail by using exemplary embodiments and by reference to the drawings, wherein FIG. 1—is a schematic cross-sectional enlarged partial view of the dental tool according to an embodiment of the present invention.

DETAILED DESCRIPTION OF THE INVENTION

Figures 1, 2, 3:
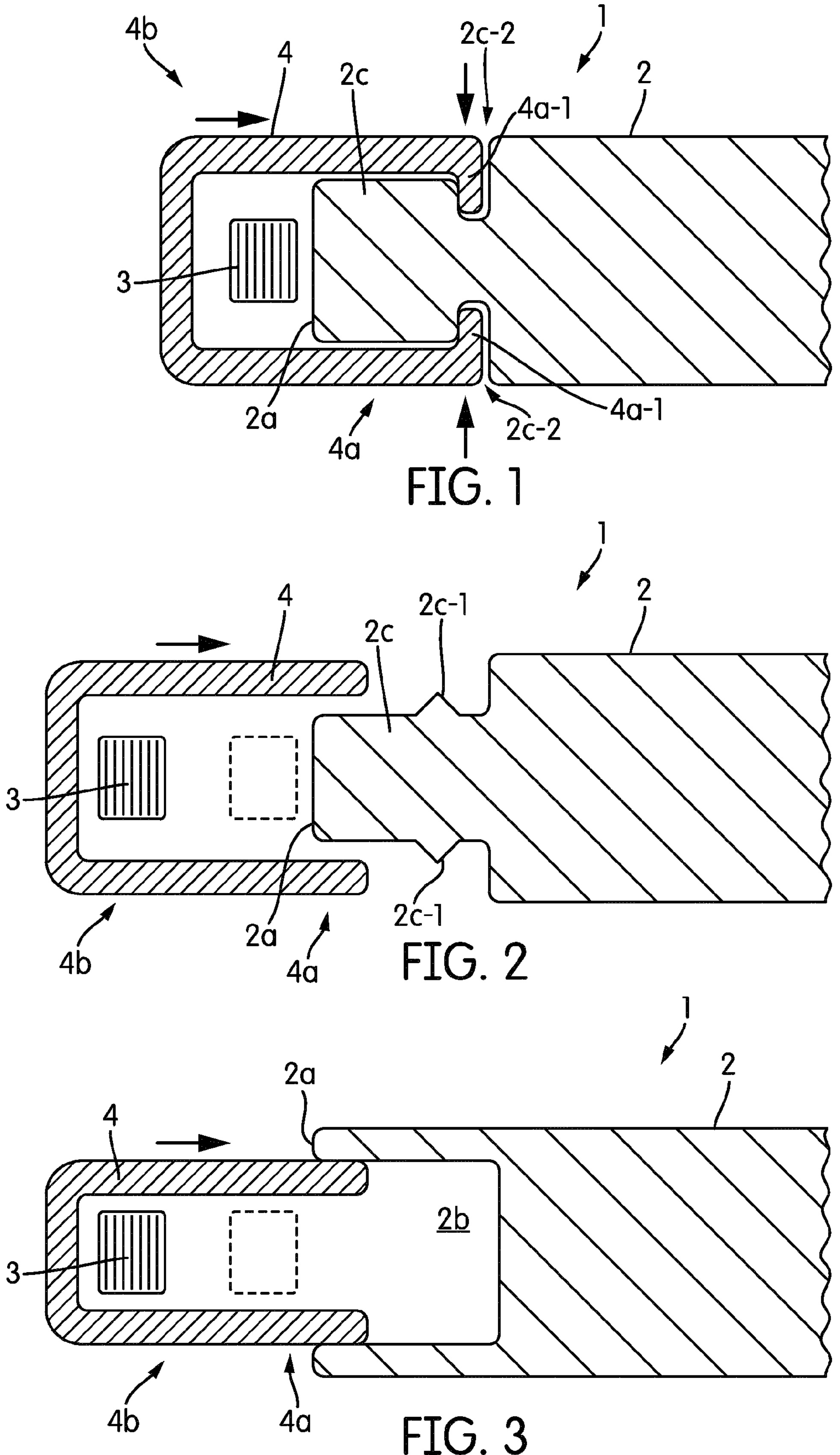
FIG. 2—is a schematic cross-sectional enlarged partial view of the dental tool according to another embodiment of the present invention.
FIG. 3—is a schematic cross-sectional enlarged partial view of the dental tool according to other embodiments of the present invention.

The reference numbers shown in the drawings denote the elements as listed below and will be referred to in the subsequent description of the exemplary embodiments:

- 1. Dental tool
- 2. Shaft
  - 2*a*. Back end
  - 2*b*. Bore
  - 2*c*. Reduced diameter section
    - 2*c*-1. Protrusion
    - 2*c*-2. Groove
- 3. Miniatured RFID tag (with air core coil)
- 4. Housing
  - 4*a*. Front section
    - 4*a*-1. Claw
  - 4*b*. Rear section
- 5. Dental CNC milling/grinding machine
  - 5*a*. Machine compartment
  - 5*b*. Carriage unit
  - 5*c*. Transceiver unit
  - 5*d*. Camera
  - 5*e*. Display
  - 5*f*. Panel
  - 5*g*. Lid
- 6. Workpiece
- P1, P2: Positions of dental tools (1) on the left carriage unit (5*b*).
- P1', P2': Positions of dental tools (1) on the right carriage unit (5*b*).

Figure 4:
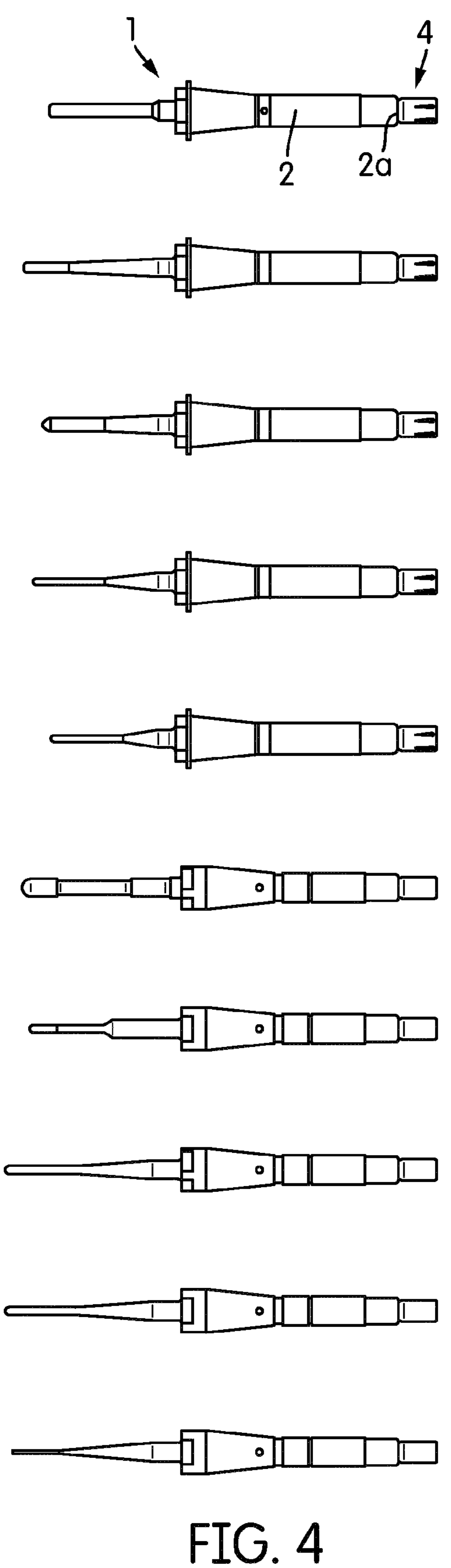
FIG. 4—are schematic side views of various dental tools according to other embodiments of the present invention.
Figure 5:
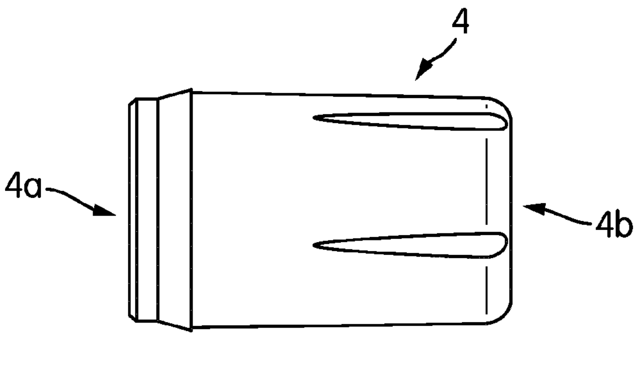
FIG. 5—is a schematic enlarged side view of the protective housing for the miniaturized RFID tag of the dental tool according to an embodiment of the present invention.
Figure 6:
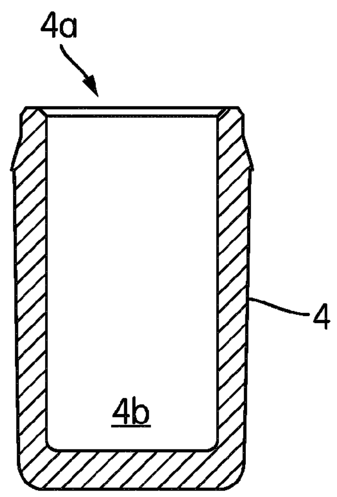
FIG. 6—is a schematic vertical sectional view of the protective housing of FIG. 5.
Figure 7:
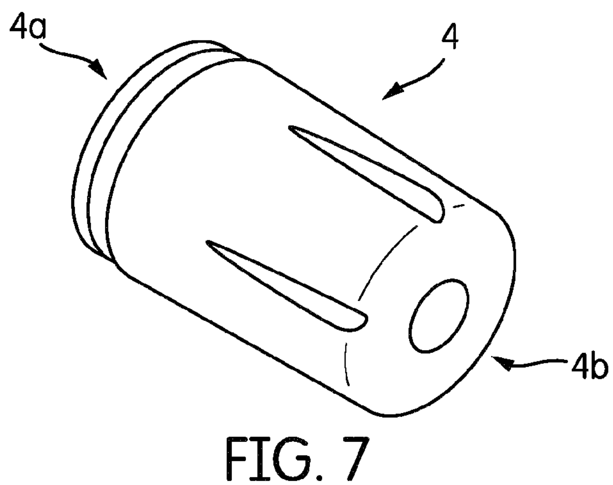
FIG. 7—is a schematic perspective view of the protective housing of FIG. 5.
Figures 9, 10:
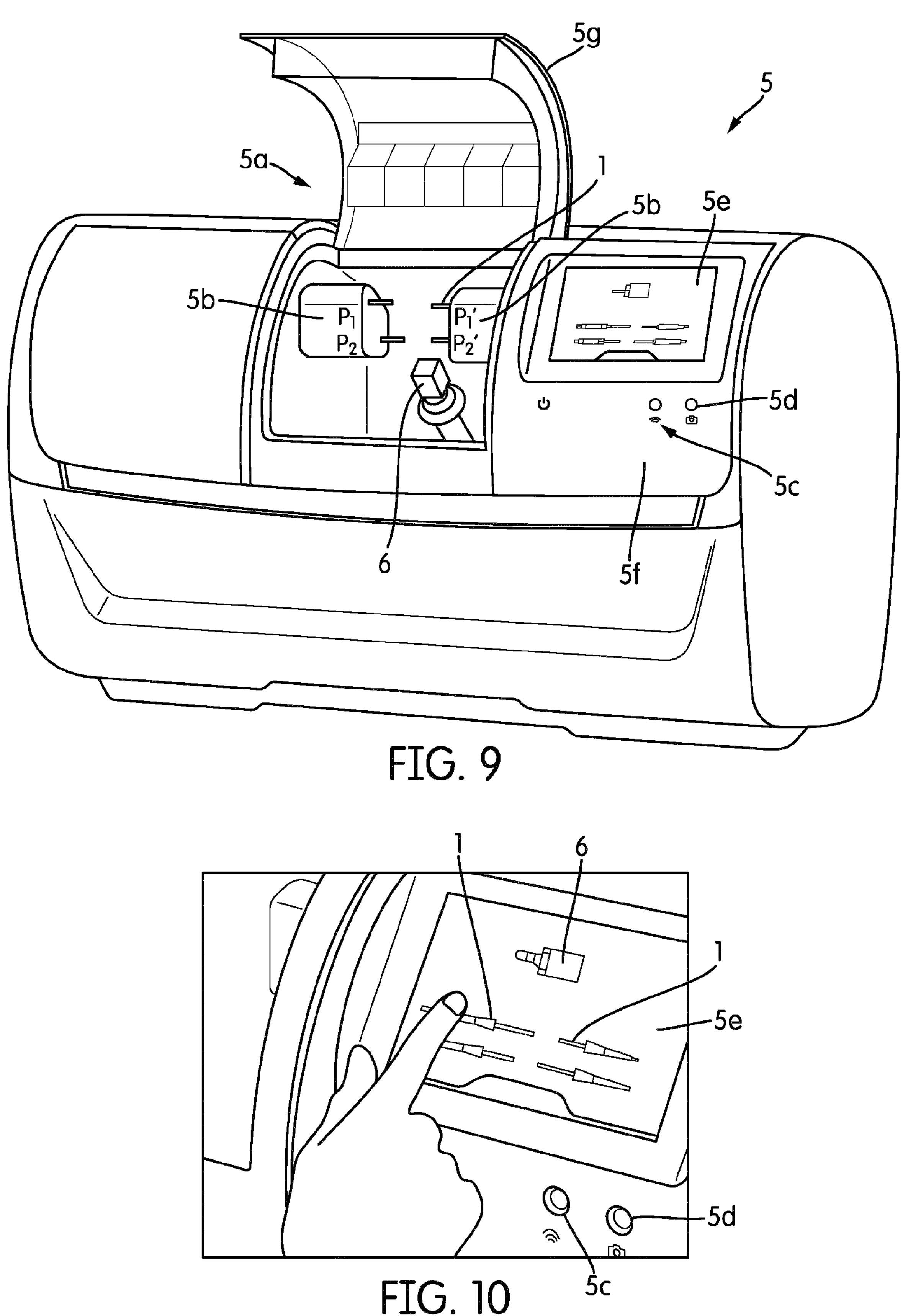
FIG. 9—is a schematic perspective view of the dental CNC milling/grinding machine of FIG. 8, wherein the lid of the machine compartment has been opened.
FIG. 10—is a schematic enlarged perspective view of the display of the dental CNC milling/grinding machine of FIG. 8, wherein the display shows the consumables.

As shown in FIG. 9, the dental tool (1) of the present invention is suitable for use in a dental CNC (computer numeric controlled) milling/grinding machine (5) for machining a dental restoration from a workpiece (6). The dental tool (1) is suitable for milling/grinding the workpiece and preferably also for calibrating the dental CNC milling/grinding machine (5) through touching the workpiece (6). In FIG. 4, various dental tools (1) according to alternative embodiments of the present invention are illustrated. These dental tools (1) vary, for instance, in type, length, and concentricity. Their length typically ranges between 40 mm to 60 mm. As shown in FIG. 4, the dental tool (1) has a shaft (2) and a protective housing (4) which is connected to the back end (2*a*) of the shaft (2).

FIG. 1 shows the interior of the protective housing (4) of the dental tool (1) according to an embodiment of the present invention. As shown in FIG. 1, a miniaturized RFID tag (3) is arranged in front of the back end (2*a*) of the shaft (2). The miniaturized RFID tag (3) is preferably a read-only type. Alternatively, a read & write type may be used. The miniaturized RFID tag (3) may also be provided integrally with an air core coil. The miniaturized RFID tag (3) is covered by the protective housing (4). However, the protective housing (4) is optional. Alternatively, the miniaturized RFID tag (3) can be directly adhered to the front of the back end (2*a*) of the shaft (1) with some sealant adhesive. The front section (4*a*) of the protective housing (4) is connected to the back end (2*a*) of the shaft (2). The miniaturized RFID tag (3) is arranged outside the shaft (2) and in the rear section (4*b*) of the protective housing (4).

As shown in FIG. 1, the dental tool (1) has a reduced diameter section (2*c*) which has grooves (2*c*-2). The front section (4*a*) of the housing (4) has claws (4*a*-1). The claws (4*a*-1) are fitted into the grooves (2*c*-2).

FIG. 2 shows a dental tool (1) according to an alternative embodiment of the present invention. In this alternative embodiment, the reduced diameter section (2*c*) has protrusions (2*c*-1) instead of the grooves (2*c*-2). In this alternative embodiment, the front section (4*a*) of the protective housing (4) is provided without claws (4*a*-1) and is fitted onto the protrusions (2*c*-1). The dashed lines in FIG. 2 show the position where the miniaturized RFID tag (3) is located after the assembly.

FIG. 3 shows a dental tool (1) according to another alternative embodiment of the present invention. In this alternative embodiment, the back end (2*a*) of the shaft (2) has a bore (2*b*). And the front section (4*a*) of the protective housing (4) is fitted into the bore (2*b*). Similarly, in FIG. 3 the dashed lines show the position where the miniaturized RFID tag (3) is located after the assembly.

In each of the embodiments as shown in FIG. 1 to FIG. 3, the miniaturized RFID tag (3) is arranged such that it is circumferentially and rearwardly unblocked by the shaft (2) for the RF communication. The protective housing (4) is permeable to radio frequencies. The housing (4) is preferably made from plastic material. The protective housing (4) is preferably cylindrical shaped with a generally u-shaped cross-section.

Figure 8:
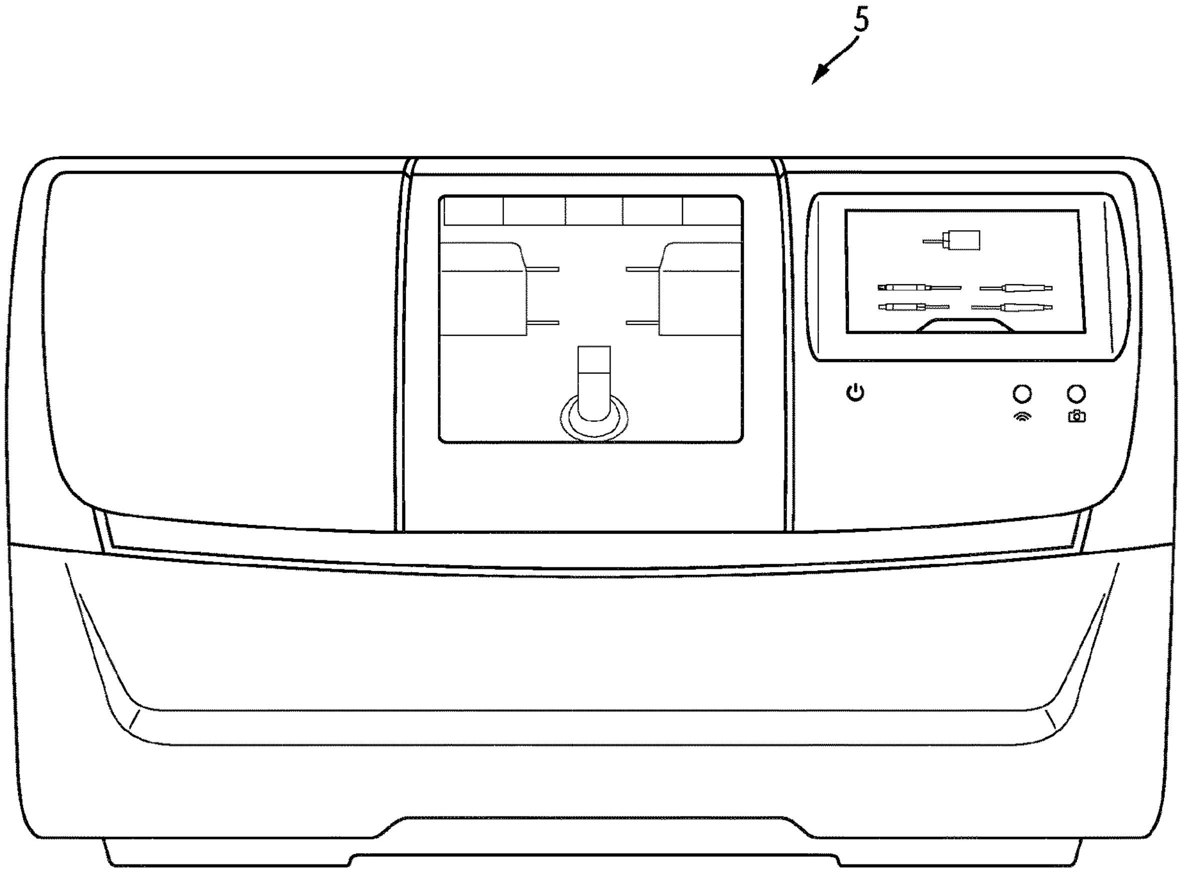
FIG. 8—is a schematic front view of a dental CNC milling/grinding machine according to an embodiment of the present invention.

As shown in FIG. 8, the present invention also provides a dental CNC milling/grinding machine (5). As shown in FIG. 9, the dental CNC milling/grinding machine (5) has a lid (5*g*) for opening/closing a machine compartment (5*a*) for accessing the consumables such as the workpiece (6) and the dental tools (1). The dental CNC milling/grinding machine (5) comprises: a mounting unit for mounting at least one workpiece (6); the machine compartment (5*a*) including two opposed carriage units (5*b*) for simultaneous machining, each adapted to exchangeably receive and drive one or more dental tools (1) according to the present invention; one or more transceiver units (5*c*) adapted to read the miniaturized RFID tag (3) of a dental tool (1); and a control unit adapted to individually control the transceiver units (5*c*) and the carriage units (5*b*) based on the information read from the miniaturized RFID tags (3). Each transceiver unit (5*c*) is adapted to only read a miniaturized RFID tag (3). Alternatively, the transceiver units (5*c*) may also be adapted to read & write a miniaturized RFID tag (3). The dental CNC milling/grinding machine (5) preferably has a communication unit for transmitting information to and/or receiving information from a data storage unit. This information may also relate to dental tool specific information. The data storage unit is preferably internal to the dental CNC milling/grinding machine. The data storage unit may also store dental tool specific information of the dental tool (1).

Alternatively, the data storage unit may be external to the dental CNC milling/grinding machine (5), and accessible via a network, the internet or the like. The dental CNC milling/grinding machine (5) preferably has a display (5*e*), more preferably a touch-screen display (5*e*), for displaying information based on the dental tool specific information relating to the dental tool (1). The dental CNC milling/grinding machine (5) has a panel (5*f*) that entirely or partially covers one or more transceiver units (5*c*). The panel (5*f*) is sufficiently thin or has an aperture to allow RF communication between the miniaturized RFID tag (3) and the transceiver unit (5*c*). In addition, or alternatively, one or more transceiver units (5*c*) are arranged close to the mounting positions (P1,P2,P1',P2') of the dental tools (1) in one or more carriage units (5*b*). The antennas of one or more transceiver units (5*c*) are preferably configured by the associated stators of the dental tool motors in one or more carriage units (5*b*). In addition, or alternatively, one or more separate antennas may be arranged for the transceiver units (5*c*) into the carriage units (5*b*).

The dental CNC milling/grinding machine (5) preferably also has camera (5*d*) for reading barcodes on the consumables such as the dental tool (1) or the workpiece (6) for recognizing them. The recognized consumables can be displayed using script and/or icons on the display (5*e*) with additional guidance information. The rear end of the shaft (2) preferably has a mounting thread (not shown) for mounting the same into the carriage unit (5*b*), namely into the spindle of the dental tool motor. The shaft (2) can be mounted by using a turning wrench that form-fittingly engages with the front end of the shaft (2) during the mounting process. Alternatively, instead of a mounting-thread other type of connections may be used.

The miniaturized RFID tag (3) of the dental tool (1) stores dental tool specific information which specifically relates to the dental tool (1). The dental tool specific information includes at least a unique ID for identifying the dental tool (1). The dental tool specific information preferably further includes information on at least one of the manufacturer, the lot number, the type, the length, and the concentricity of the dental tool (1). In case the miniaturized RFID tag (3) is a read & write type, then the dental CNC milling/grinding machine (5) also stores the remaining service life into the dental tool (1) via the transceiver unit (5*c*). Alternatively, or in addition, the data storage unit includes at least a unique ID for identifying the dental tool (1) and information on at least one of the manufacturer, the lot number, the type, the length, and the concentricity, and the remaining service life of the dental tool (1). The remaining service life of the dental tool (1) can be monitored by the dental CNC milling/grinding machine (5) on the display (5*e*)

The user can be guided, for instance, through a display (5*e*) of information relating to the workpiece (6) and the dental tools (1) that are planned for use in the next machining process set forth through the CAD/CAM software. For instance, the type of the workpiece (6), the type of the dental tools (1) to be used, the minimum necessary remaining service lives, their designated mounting positions (P1,P2,P1',P2') on the carriage units (5*b*), or the like can be displayed on the display (5*e*) to the user as shown FIG. 10. The control unit can inhibit drive of a carriage unit (5*b*) when it has determined that the mounted workpiece (6) is wrong, or a mounted dental tool (1) is worn or has an insufficient remaining service life or is mounted to a wrong position in the carriage unit (5*b*).

The user can be informed, for instance, through the display (5*e*) of information relating to the dental tools (1) identified through the transceiver unit (5*c*) before mounting or after mounting to the carriage unit (5*b*). The dental tool specific information of the identified dental tool (1) such as the remaining service life, the type of the dental tool (1), the mounted position, and the like can be displayed to the user. The workpiece (6) can be provided with a barcode to be read through the camera (5*d*), and the relevant information can be displayed on the display (5*e*) as shown in FIG. 10.

The invention claimed is:

1. A system comprising:

a dental tool configured to be mounted in a dental CNC milling/grinding machine, the dental tool configured for machining a dental restoration from a workpiece under direction of the dental CNC milling/grinding machine, the dental tool comprising:

a shaft extending along a longitudinal axis, the shaft comprising:

a back end positioned along the longitudinal axis for mounting with the dental CNC milling/grinding machine, the back end comprising a reduced diameter section; and a front end disposed opposite the back end and positioned along the longitudinal axis;

a RFID tag which is attached to the dental tool at the back end of the shaft; and a protective housing connected to the back end of the shaft for covering the RFID tag and for attaching the RFID tag to the shaft along the longitudinal axis, wherein the protective housing comprises:

an interior cavity in which the RFID tag is received;

a front section, the front section configured to fit the reduced diameter section of the back end of the shaft into the interior cavity so as to mechanically connect the protective housing to the back end of the shaft; and a rear section extending axially rearward from the front section; and the dental CNC milling/grinding machine configured to receive the dental tool, said dental CNC milling/grinding machine comprising:

a machine compartment including one or more carriage units for machining, each of the one or more carriage units adapted to exchangeably receive the back end of the dental tool with the connected protective housing and the RFID tag and drive the dental tool for machining the dental restoration from the workpiece;

at least one transceiver unit adapted to read and/or write to the RFID tag of the dental tool; and a control unit adapted to control the at least one transceiver unit, and the one or more carriage units based on the information read from the RFID tag.

2. The system according to claim 1, wherein the protective housing comprises a cylindrical body having a u-shaped cross-section defining the interior cavity for the RFID tag.

3. The system according to claim 2, wherein the protective housing is fabricated of a plastic material.

4. The system according to claim 3, wherein the reduced diameter section of the back end of the shaft has at least one protrusion, and wherein the front section of the protective housing is fitted onto the at least one protrusion.

5. The system according to claim 4, wherein a space disposed between the protective housing and the RFID tag is filled with a sealant.

6. The system according to claim 5, wherein the protective housing and the RFID tag have a concentric, rotationally symmetric and balanced arrangement on the shaft.

7. The system according to claim 6, wherein the protective housing allows for rotation of the dental tool at speeds up to 60,000 revolutions per minute.

8. The system according to claim 3,
wherein the reduced diameter section of the back end of the shaft has one or more grooves, and the front section of the protective housing has one or more claws, and
wherein the one or more claws are fitted into the one or more grooves.

9. The system according to claim 1, wherein the RFID tag is a read-only type or a read-and-write type.

10. The system according to claim 1, wherein the RFID tag comprises a coil.

11. The system according to claim 1,
wherein the RFID tag stores dental tool specific information which specifically relates to the dental tool, and
wherein the dental tool specific information includes at least a unique ID for identifying the dental tool.

12. The system according to claim 11, wherein the dental tool specific information further includes information on at least one of the manufacturer, the lot number, the type, the length, and the concentricity of the dental tool.

13. The system according to claim 11, wherein the dental tool specific information further includes the remaining service life of the dental tool.

14. The system according to claim 1, wherein the dental CNC milling/grinding machine is adapted to store dental tool specific information of one or more dental tools including the dental tool.

15. The system according to claim 14, wherein the dental tool specific information includes at least a unique ID for identifying the dental tool and information on at least one of the manufacturer, the lot number, the type, the length, the concentricity, and the remaining service life of the dental tool.

16. The system according to claim 14, wherein the control unit is configured to inhibit driving of the one or more carriage units if it is determined that the dental tool is worn or has an insufficient remaining service life based on the dental tool specific information.

17. The system according to claim 14, further comprising:
a display for displaying information based on the dental tool specific information relating to the dental tool,
wherein the displayed information includes at least the remaining service life of the dental tool and/or a position (P1, P2; P1', P2') on the one or more carriage units where the dental tool is mounted by a user of the system.

18. The system according to claim 1, further comprising:
a panel for receiving the at least one transceiver unit,
wherein the panel is configured to allow communication between the RFID tag and the at least one transceiver unit.

19. The system according to claim 1, wherein the at least one transceiver unit is arranged in the dental CNC milling/grinding machine to be in communication with the RFID tag when the dental tool is loaded in the one or more carriage units.

20. A system comprising:
a dental tool configured to be mounted in a dental CNC milling/grinding machine, the dental tool configured for machining a dental restoration from a workpiece under direction of the dental CNC milling/grinding machine, the dental tool comprising:
a shaft, the shaft comprising:
a back end for mounting with the dental CNC milling/grinding machine; and
a front end disposed opposite the back end;
a RFID tag arranged proximate the back end of the shaft; and
a protective housing connected to the back end of the shaft for covering the RFID tag and for attaching the RFID tag to the shaft, the protective housing comprising:
a cylindrical body defining an interior cavity for the RFID tag and having a u-shaped cross-section, wherein the interior cavity is configured to receive therein a reduced diameter section of the back end of the shaft or wherein the u-shaped cross-section is configured to fit into a bore of the back end of the shaft; and
the dental CNC milling/grinding machine configured to receive the dental tool, said dental CNC milling/grinding machine comprising:
a machine compartment including one or more carriage units for machining, each of the one or more carriage units adapted to exchangeably receive the back end of the dental tool with the connected protective housing and the RFID tag and drive the dental tool for machining the dental restoration from the workpiece;
at least one transceiver unit adapted to read and/or write to the RFID tag of the dental tool; and
a control unit adapted to control the at least one transceiver unit, and the one or more carriage units based on the information read from the RFID tag,
wherein the protective housing and the RFID tag have a concentric, rotationally symmetric and balanced arrangement on the shaft.

21. The system according to claim 20,
wherein the back end of the shaft has the bore formed therein, and
wherein the front section of the protective housing is fitted into the bore.

22. A system comprising:
a dental tool configured to be mounted in a dental CNC milling/grinding machine, the dental tool configured for machining a dental restoration from a workpiece under direction of the dental CNC milling/grinding machine, the dental tool comprising:
a shaft comprising a back end for mounting with the dental CNC milling/grinding machine and a front end disposed opposite the back end, wherein the back end comprises at least one protrusion that radially projects from the back end and that extends circumferentially about the back end of the shaft;
a RFID tag which is attached to the dental tool and is arranged proximate the back end of the shaft; and
a protective housing connected to the back end of the shaft for covering the RFID tag, wherein the protective housing comprises:
a front section configured to fit over the at least one protrusion to mechanically connect the protective housing to the back end of the shaft; and
a rear section extending axially rearward from the front section; and
the dental CNC milling/grinding machine configured to receive the dental tool, said dental CNC milling/grinding machine comprising:
a machine compartment including one or more carriage units for machining, each of the one or more carriage units adapted to exchangeably receive the back end of the dental tool with the connected protective housing and the RFID tag and drive the dental tool for machining the dental restoration from the work-piece;

at least one transceiver unit adapted to read and/or write to the RFID tag of the dental tool; and a control unit adapted to control the at least one transceiver unit, and the one or more carriage units based on the information read from the RFID tag, wherein a space disposed between the protective housing and the back end of the shaft is filled with a sealant such that the RFID tag is encapsulated by the sealant.

* * * * *